June 16, 1953  C. S. GARLAND ET AL  2,642,186
FILTER
Filed Nov. 30, 1950  7 Sheets-Sheet 2

Inventors
Charles Samuel Garland
By Morris Heron Rogers
Morris & Bateman
Attorneys June 16, 1953  C. S. GARLAND ET AL  2,642,186
FILTER
Filed Nov. 30, 1950  7 Sheets-Sheet 3

Fig. 3

Inventors
Charles Samuel Garland
Francis Theron Rogers
By
Attorneys

C. S. GARLAND ET AL 2,642,186

FILTER

Filed Nov. 30, 1950

Inventors
Charles Leonard Garland
Francis Theron Rogers
By
Attorneys

June 16, 1953     C. S. GARLAND ET AL     2,642,186
FILTER Filed Nov. 30, 1950     7 Sheets-Sheet 6

Inventors
Charles Samuel Garland
Francis Theron Rogers
By
Attorneys

Patented June 16, 1953

2,642,186

UNITED STATES PATENT OFFICE 2,642,186

FILTER

Charles Samuel Garland and Francis Heron Rogers, London, England

Application November 30, 1950, Serial No. 198,258
In Great Britain December 1, 1949

16 Claims. (Cl. 210—152)

This invention relates to filters of the kind in which a liquid is filtered by passing it through passages, of a predetermined size, between the adjacent surfaces of a plurality of filter elements forming the filtering member which are assembled upon a hollow support or drainage member through which the filtered liquid passes after filtration.

Filters of the kind above referred to have hitherto been manufactured in two different ways. The first consists in forming the filter as an assembly of rings or discs arranged on a central drainage member and secured together by endwise compression, the rings or discs normally being minted so as to provide a predetermined space for edgewise filtration between adjacent discs. Alternatively, the discs or rings are formed of surfaced paper or like material, the gap between the adjacent discs being determined by the surface texture of the discs and the endwise pressure applied to the assembly. In the second method the filter elements are formed by adjacent convolutions of a wire which is wound in a helix about a central drainage element, the wire being deformed at intervals to provide a predetermined space for filtration between adjacent filter elements.

Filters of the above kind have not hitherto included any means whereby the spacing between adjacent filter elements could be accurately varied, and in particular, such filters were incapable of accurate adjustment, or practically so, when in operation, their use for different degrees of filtration necessitating dismantling for adjustment or the interchange of filter element assemblies.

A further difficulty which has arisen in the use of filters of the kind aforesaid has been that of cleaning the filter elements of the foreign matter removed from the liquid during filtration, this difficulty being greater when a fine degree of filtration was being carried out.

Some of the difficulties inherent in filters of the kind referred to have been removed by the employment of carefully graded filter aid but in some kinds of filtration in which very fine filtration is required the employment of filter aid is not suitable.

Although filters of the kind above referred to have hitherto been designed to give a predetermined space between adjacent filter elements in order to determine the degree of filtration, it has not normally been possible to effect any degree of positive and accurate adjustment of the gap between adjacent filter elements.

The invention aims at providing a filter of the kind above referred to in which the degree of filtration may be positively regulated, if desired during the operation of the filter, by adjustment of the gaps between adjacent filter elements, the adjustment being such as to provide an accurate variation in the degree of filtration from that provided by a micro-filter to that provided by a strainer.

The invention further aims at providing a means whereby the surfaces of the adjacent filter elements may be positively cleaned without dismantling the filter, in addition to the degree of cleaning which may be effected by the normal operation of back-flushing the filter.

A further object of the invention is the provision of a filter capable of separating admixed liquids, in which one liquid forms an emulsion or dispersion with the other, such as oil in a continuous phase and water in a discontinuous phase.

According to the invention a filter of the kind above referred to is provided wherein means are provided for positively adjusting the gap between adjacent surfaces of a plurality of filter elements during the operation of the filter, and for inserting cleaning members between the adjacent filter elements and effecting relative rotation between said cleaning members and said filter elements in order positively to remove the foreign matter accumulating between said gaps, without dismantling the filter.

According to one form of the invention a filter is provided wherein the filter elements constituting the filtering member are formed as a helical member of impermeable material and of substantially square cross section, the gaps between the adjacent convolutions of said helical member which constitute the filter elements being adapted to be positively adjusted by the application of axial pressure or tension thereto.

According to another form of the invention a filter is provided wherein the filter elements constituting the filtering member are formed as a series of flat annular plates of impermeable material mounted upon a perforate hollow drainage tube, the gap between adjacent filter elements being adjustable by means of wedge members which are adapted to be positively and adjustably located, at a varying distance measured radially from the central axis of said drainage tube, in wedge-shaped openings formed at the periphery of adjacent filter elements.

In either of the two forms of the invention referred to above means are provided for inserting in the gaps between adjacent filtering elements a plurality of cleaning elements or fingers and for effecting relative rotation between said filter elements and said fingers to effect positive removal of foreign matter which has accumulated between said elements during the operation of filtration.

Reference will now be made to the accompanying drawings which illustrate different forms of construction according to the invention and in which.

In the form of construction according to Figs. 1–7 the filter elements are formed by the convolutions of a helical filtering member 1 which may be of metal or other suitable material. The filtering member 1 may either be formed from a solid tube or from a helically wound length of wire. In the former case the tube from which the helical filtering member is cut (for example, a steel tube, or a tube of centrifugally cast iron the internal diameter of which is accurately bored out to receive a drainage tube), is filled with a material, e. g. a metal, capable of receiving the end of a cutting tool and of being removed as a core after the cutting operation. Thus the steel or cast iron tube is filled with a metal having a lower, preferably a much lower, melting point than the tube from which the helical filtering member is formed. This arrangement enables the helical convolutions of the tube to be cut with a thin parting tool set at a suitable angle to give the required helical thread cut, the tool being gradually inset until the core is penetrated and the steel or cast iron tube being left with a precision machined helical thread cut, whilst the inner surface of the convolutions is without burrs or other irregularities.

The tube from which the helical filtering member is cut may alternatively be filled with a core of wood which is driven in, the wooden core being pushed out after the cutting operation. As a further alternative the core may be made of a material soluble in chemical solutions inert to the material of the helical member, such as synthetic resins which are soluble in alkali.

When the filtering member is formed by the second of the two mentioned methods, namely from a helically wound length of wire, the wire is made of bucket section so as to provide parallel surfaces between adjacent convolutions when wound into a helix.

The helical member 1 formed by either of the methods described above will provide between adjacent convolutions a gap, the normal size of which is determined by that of the cut made by the cutting tool or the spacing of the convolutions during the winding of the wire. The gap between adjacent convolutions is bounded by plane surfaces and provides a passage for filtration which is uniform, within fine limits, throughout the length of the filtering member. The passage for filtration may be adjusted by applying axial compression or tension to the helical filtering member 1, the convolutions being brought uniformly closer together or further apart from each other through the resilience of the material of which the filtering member is made.

In the form of construction according to Figs. 1–7 the filtering member 1 is mounted in a cylindrical body 2 closed at the base by a base plate 3 and at the top by a flange plate 4, a gear casing 5 and a cover plate 6. The cylindrical body 2 is welded or brazed at top and bottom to the flange plate 4 and the base plate 3 respectively; the flange plate is secured to the gear casing 5 by bolts 7; and the cover plate 6 is bolted on to the gear casing 5 by bolts 8.

Figure 4:
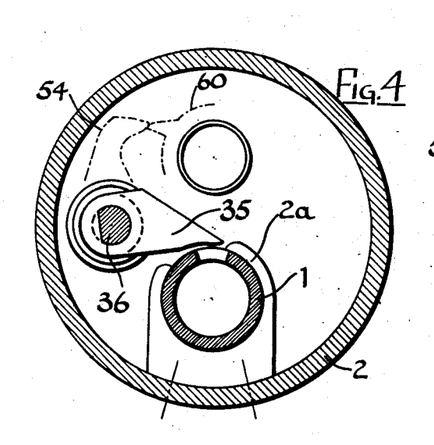
Fig. 4 is a section on the line IV—IV of Fig. 3

In order to prevent bowing of the filtering member 1 under axial compression one or more support members 2a secured to the body 2 are arranged (as shown in Fig. 4) to engage about a portion of the periphery of the filtering member 1 at one or more points along the length thereof, the supports leaving sufficient clearance for the introduction of the cleaning fingers 35.

The gear casing 5 is provided with an inlet port 9 and an outlet port 10, the former communicating with the interior of the body 2 and the latter with the interior of the filtering member 1, as will be described hereinafter.

In order that pressure may be applied in a truly axial direction to the filtering member 1 the latter is mounted at its lower end in a solid lower abutment 11 and at its upper end in an upper abutment 12, the latter being formed hollow and constituting a drainage tube. The upper portion of the lower abutment 11 is formed with a shoulder of the same external diameter as the filtering member 1 and is cut with a helical groove 11a similar to that in member 1, whilst the end face of the abutment 11 and that of the filtering member 1 are machined flat, the tail of the lowest convolution of the member 1 being anchored in a recess 11b formed in the upper face of the lower abutment 11. The abutment 11 also has an integral boss 11c which fits within the lower end of the member 1.

Figure 1:
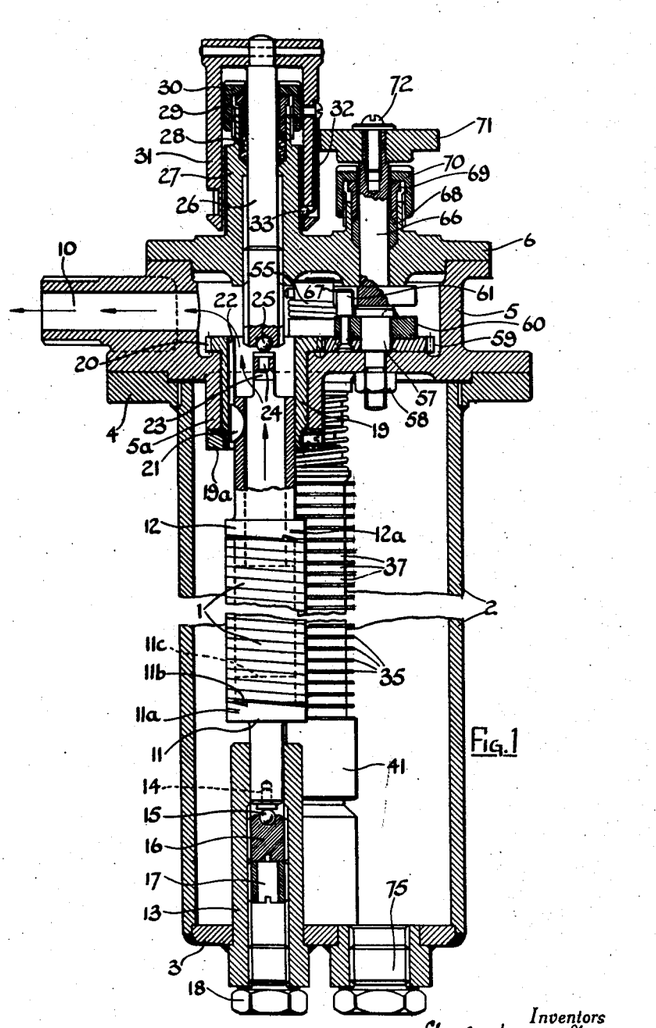
Fig. 1 is a sectional elevation through one form of construction of the filter according to the invention.

The lower end of the abutment 11 is journalled within a bearing 13 secured in the base plate 3 and abuts with a stud 14, mounted in the end of the abutment 11, against a steel ball 15 carried in an adjustable threaded stop 16 which screws into an internally threaded portion of the bearing 13, as shown in Fig. 1. The lower face of the stop 16 is slotted to receive a screwdriver and is secured in its adjusted position by means of a hollow locking screw 17. The bearing 13 is sealed externally by a threaded plug 18.

The upper abutment 12 is hollow but has an external helical groove 12a and is fitted within the upper end of the filtering member 1 in the same manner as the lower abutment 11.

The upper portion of the abutment 12 is slidably mounted in a sleeve 19 having gear teeth 20 formed integral therewith the two parts being secured against rotation by a key 21 slidable in a key-way 22. The sleeve 19 is journalled in a bearing formed in a dependent boss 5a integral with the gear casing 5. A locking ring 19a abutting the lower face of the boss 5a is secured to the lower end of the sleeve 19 to prevent upward movement thereof within the boss 5a. The upper end of the abutment 12 has secured thereto a bridge piece 23 in which is carried an abutment stud 24 which abuts a steel ball 25 carried in the lower end of a threaded shaft 26 which screws into an internally threaded boss 27 integral with the cover plate 6.

The upper end of the boss 27 is sealed with a packing gland 28, 29, 30. Secured on the upper end of the shaft 26 is a barrel 31.

In order to provide an audible indication of the completion of a complete revolution of the barrel 31 the latter carries a spring arm 32 the free end of which urges a ball 33 into engagement with the exterior of the boss 27, the latter having two diametrically opposed longitudinal narrow slots into which the ball 33 will "click" at each half revolution of the barrel.

Also mounted within the body 2 are cleaning fingers 35 (Fig. 3), the latter being arranged on a D section shaft 36 with interposed spacing collars 37. The fingers 35 are held secured on the shaft 36 by means of an upper collar 38 pinned to the shaft 36 by a pin 39, and a nut 40 screwed on to a threaded portion of the lower end of shaft 36. The nut 40 has a sleeve 41 secured thereto, a grub-screw 34 which also locks the nut 40 on shaft 36.

The sleeve 41 surrounds the upper portion of the bearing 42, in order to prevent foreign matter entering between bearing 42 and shaft 36.

The lower end of the shaft 36 is journalled in a bottom bearing 42 secured in the base plate 3, the end of the shaft 36 having screwed thereon an abutment stud 43 which abuts a steel ball 44 carried in an adjustable stop 45 threaded into the lower part of the bearing 42 and locked by a hollow screw 46, the arrangement being similar to that for the bottom bearing 13 for the filtering member 1 described previously. The bearing 42 is similarly sealed with a threaded plug 47.

The upper end of the shaft 36 is slidably mounted within a bore in the lower end of a pivot member 48 which is rotatably mounted in a bearing formed in the gear casing 5, said pivot member 48 being formed with an external shoulder 48a the upper surface of which abuts the under side of the gear casing 5 and the lower surface of which forms a seating for one end of a helical compression spring 50, the other end of which is seated on a shoulder 38a formed on the collar 38. The lower part of the pivot member 48 is axially slotted as at 51 and the upper end of the shaft 36 is secured against rotation in the pivot member 48 by means of a pin 52 transfixing the pin and slot 51.

Figure 2:
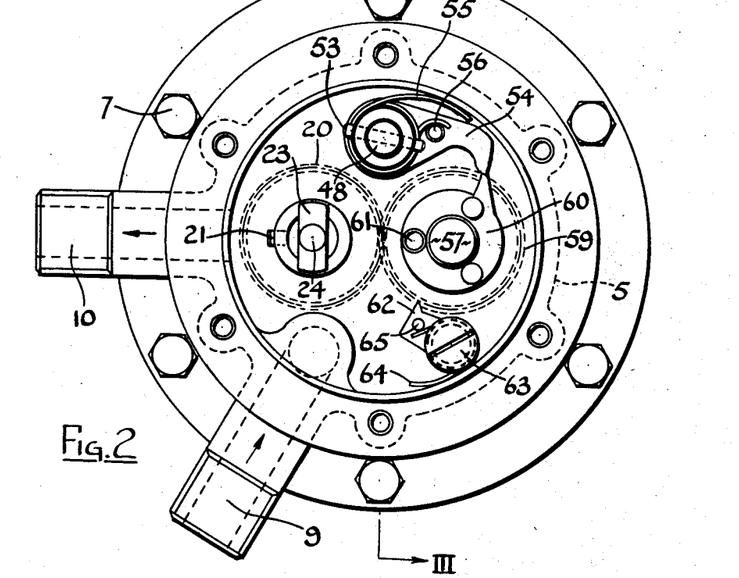
Fig. 2 is a plan of Fig. 1 with the cover plate removed.
Figure 3:
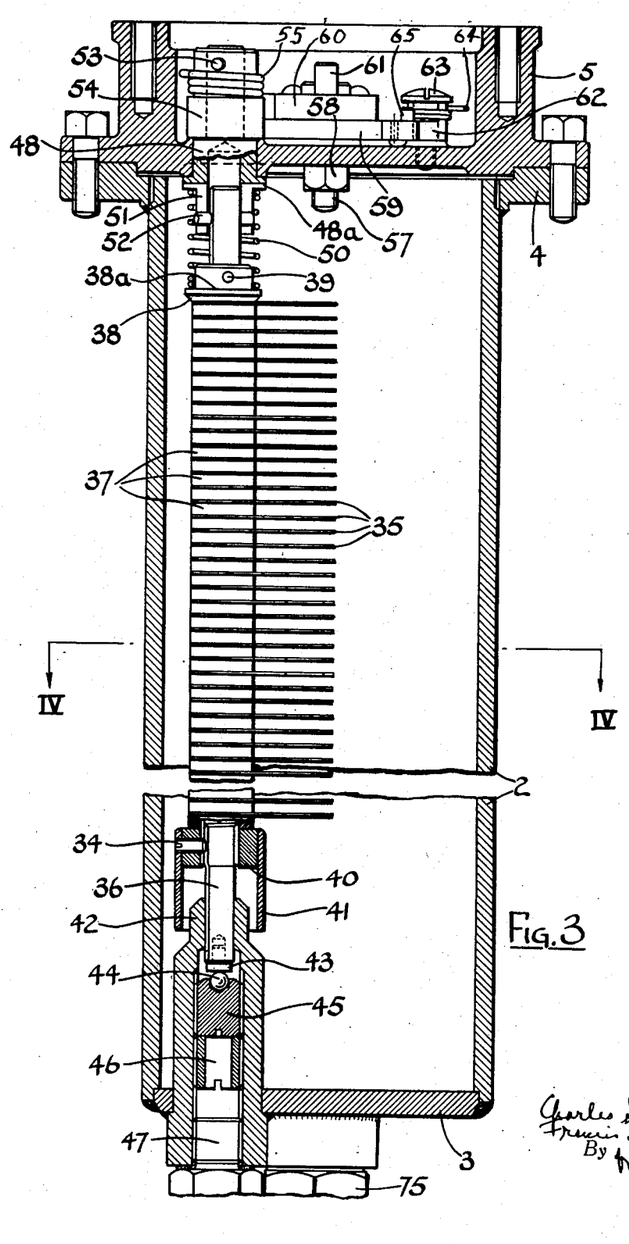
Fig. 3 is a sectional elevation on the line III—III of Fig. 2.

Secured on the upper end of the pivot member 48 by a pin 53 is a cam follower 54 on which is mounted a spring 55 (Figs. 1 and 2) one end of which abuts the wall of the gear casing 5 and the other end of which engages a pin 56 secured on the cam follower, the spring 55 urging the cam follower 54 in a clockwise direction as seen in Fig. 2.

Mounted in an opening formed in the gear casing 5 is a pivot pin 57 (Fig. 1) secured by a nut 58 on the lower threaded end thereof. The middle portion of the pin 57 is of increased diameter and has rotatably mounted thereon a spur wheel 59, meshing with the geared sleeve 19, and a cam disc 60, the spur wheel 59 and cam disc 60 being riveted together and the cam disc 60 carrying a driving pin 61 which extends upwards therefrom. The spur wheel 59 is engaged by a ratchet pawl 62 pivotally mounted on a pin 63 secured in the gear casing 5 and carrying a spring 64 one end of which abuts the wall of the gear casing 5 and the other end of which abuts a pin 65 carried by the pawl 62, the spring 64 urging the pawl into engagement with the teeth of the spur wheel 59.

Figure 6:
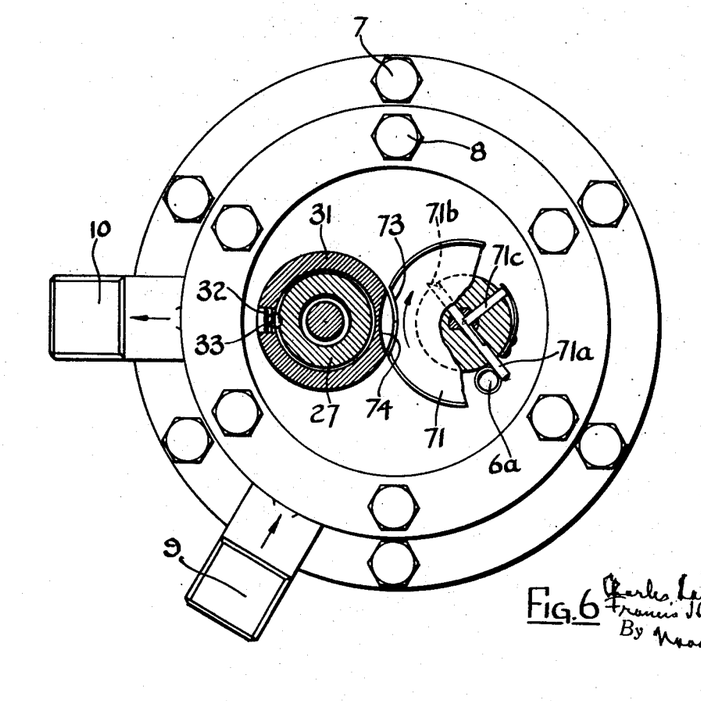
Fig. 6 is a section on the line VI—VI of Fig. 7
Figure 7:
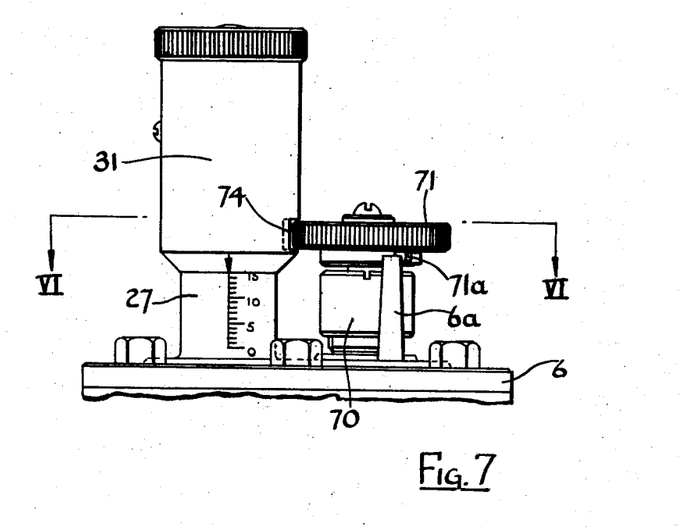
Fig. 7 is a detailed elevation of the control members of the filter.
Figure 8:
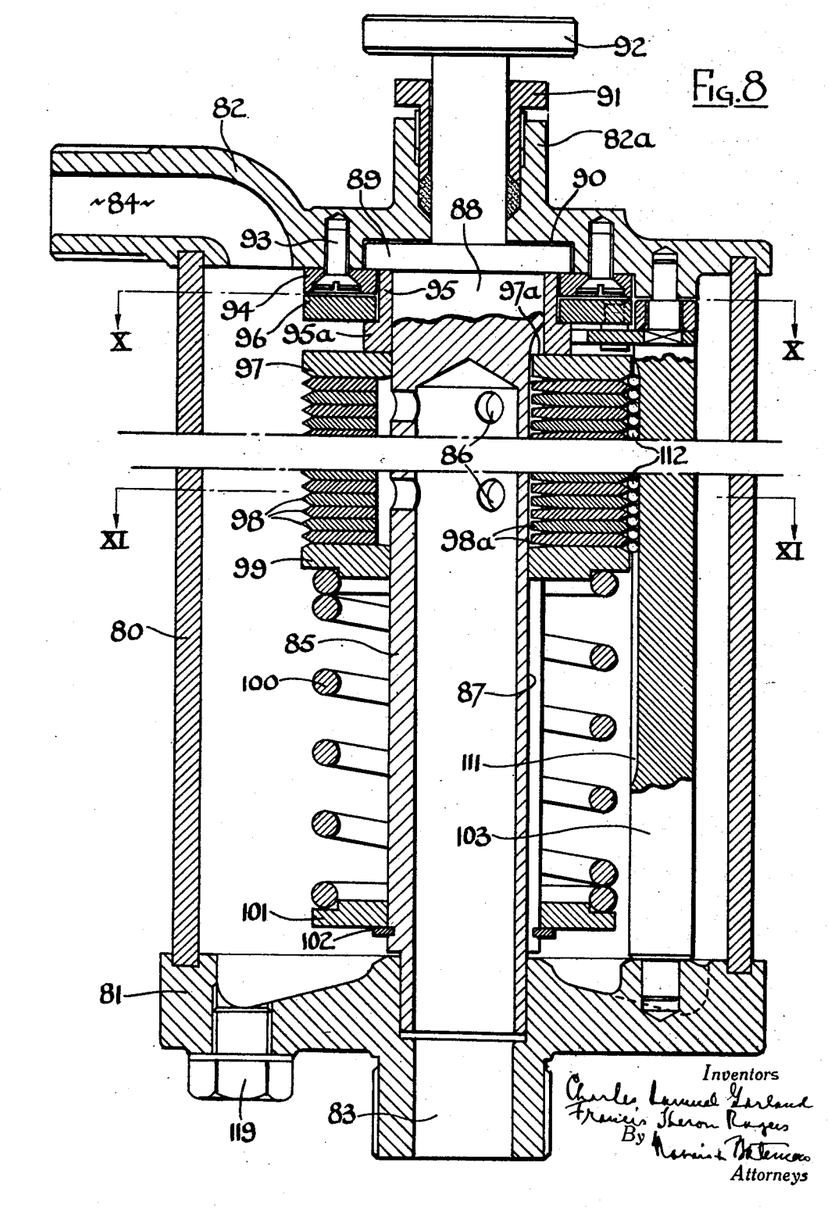
Fig. 8 is a sectional elevation of a second form of construction of a filter according to the invention on the line VIII—VIII of Fig. 9.

Pivotally mounted in the cover plate 6 is an operating shaft 66 for the cam disc 60, the lower end of the shaft 66 being of enlarged diameter and having a slot 67 thereon to engage the driving pin 61. The opening in the cover plate 6 through which the shaft 66 extends is sealed by a packing gland 68, 69, 70. The end of the shaft 66 extending upwardly through the gland 68, 69, 70, has a knurled head 71 secured thereon by a screw 72, the head 71 having an arcuate portion 73 of a radius slightly greater than the barrel 31 cut away from its periphery (Figs. 6 and 7). The barrel 31 is also formed with an arcuate recess 74, of a radius slightly greater than that of the knurled head 71 and of a depth slightly greater than that of the head 71, the purpose of which will be explained hereafter.

The cleaning fingers 35 must have sufficient strength to resist buckling when engaging between the convolutions of the filter member 1 and for this purpose they are made of a thickness such that they will be capable of insertion between the convolutions when they are at their maximum spacing from each other or nearly so. It will be appreciated, therefore, that in the example of construction illustrated the helical filtering member 1 is cut to give a space between the convolutions which is slightly greater than the thickness of the cleaning fingers 35, the filter element 1 being under slight axial compression when the spaces between the convolutions just admit the cleaning fingers 35.

Adjustment of the gap for filtration is effected by rotation of the barrel 31 the latter being conveniently provided with an indication mark and the boss 27 being preferably calibrated, as shown in Fig. 7.

The operation of cleaning the filtering member 1 is effected by rotation of the latter when the cleaning fingers are engaged between the convolutions of the filtering member 1, and for this purpose it is necessary to ensure that the cleaning fingers cannot be damaged by an attempt to tighten up the convolutions when the fingers are engaged therebetween, or by rotation of the filtering member 1 when the gap between the convolutions is not such as to admit the cleaning fingers. It is for this purpose that the barrel 31 is formed with an arcuate recess 74, as described above, the depth of which measured axially of the barrel is sufficient to accommodate the thickness of the knurled head 71, the recess 74 being located at a point along the barrel such that when the spacing between the convolutions is that required for cleaning operation the recess 74 lies in the same horizontal plane as the knurled head 71. It will be seen that in any other position of adjustment of the barrel 31 the knurled head 71 is prevented from rotation through the engagement of the periphery of the barrel 31 in the arcuate recess 73 in the knurled head 71.

Figure 5:
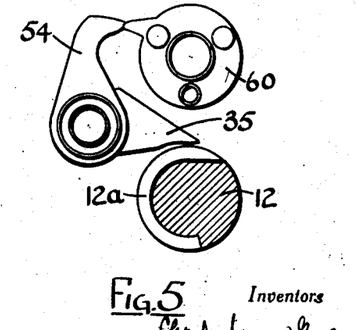
Fig. 5 is a detail plan view of the cam mechanism for actuating the cleaning fingers of the filter.

The position of the cleaning fingers 35, the cam 60 and the cam follower 54 immediately prior to the cleaning operation is shown in Fig. 5. The knurled head 71 is also in the same horizontal plane as the recess 74, and the recesses 74 and 73 are directly opposite each other (Fig. 6). In this position the cleaning fingers 35 are disengaged from the filtering member 1, the cam follower 54 being engaged by the cam edge on the cam disc 60 and the pivot member 48 having been partially rotated against the action of spring 55 and thereby having rotated to a corresponding degree the shaft 36 which is engaged in the slotted lower end of the pivot member 48.

If the knurled head 71 is now rotated in a clockwise direction the driving pin 61 of the cam disc 60 engaging in the slot 67 of the operating shaft 66 imparts rotation in a clockwise direction to the cam disc 60 and also to the spur wheel 59 which is secured thereto and in mesh with the gear sleeve 19. The first small rotation of the cam disc 60 causes disengagement of the cam follower 54 from the cam edge and thereby permits rotation of the pivot member 48 in a clockwise direction under the action of spring 55, such movement of the pivot member also imparting corresponding rotation to the shaft 36 carrying the cleaning fingers 35 which are thereby brought into engagement between the convolutions of the helical filtering member 1. It will be understood that the positioning of the cleaning fingers 35 axially of the shaft 36 is such that in the relative positions of the parts above referred to the cleaning fingers are accurately positioned with respect to the convolutions of the filtering member 1 so as to engage positively therebetween. In order to facilitate the entry of the device of the cleaning fingers 35 between the convolutions in this position of the filtering member 1 the edges of the convolutions are slightly cut away over a small portion of their periphery so to provide a point of entry which is of V-section. Upon further rotation of the knurled head 71 the filtering member 1 will also rotate therewith, being keyed to the geared sleeve 19 which meshes with the spur wheel 59, and during this operation the cleaning fingers engaged between the convolutions will positively remove foreign matter which has accumulated therebetween during the operation of filtering. After the completion of one revolution of the knurled head 71 and, accordingly, of the cam disc 60 and the filtering member 1, the cam edge on the cam disc 60 will again engage the cam follower 54 and cause it to pivot in an anticlockwise direction this movement being accordingly transmitted to the shaft 36 carrying the cleaning fingers 35 and the latter thereby being withdrawn from between the convolutions of the filtering member 1.

It will be obvious that during the previous operation in which the filtering member 1 was rotated with the cleaning fingers engaged in the convolutions thereof the blades will have been caused to move axially by an amount dependent on the pitch of the helix and such movement is accommodated by the spring 50, the upper end of the shaft 36 sliding upwardly within the slotted lower end of the pivoted member 48. As soon as the cleaning fingers 35 are disengaged from the filtering member 1 they will be returned to their normal position by the spring 50.

It will be noted that the sleeve 41 will effectively prevent foreign matter dislodged by the cleaning fingers from entering between the shaft 36 and the lower bearing 42 whatever the axial position of the shaft 36.

After the conclusion of the cleaning operation described above, when the arcuate recesses in the barrel 31 and the knurled head 71 are once more in the relative position shown in Fig. 6, the barrel 31 may be rotated to give the desired gap between the convolutions of the filter member 1 in accordance with the requirements for filtration at any time, and such adjustment may be made if desired during the operation of the filter. The foreign matter removed by the cleaning fingers 35 will accumulate at the bottom of the body 2 and may be removed by drainage from the base of the body, a removable drainage plug 75 being conveniently provided for this purpose as shown in Fig. 1.

As shown in Figs. 6 and 7, the shaft 66 and head 71 are transfixed by a pin 71a which is slidably mounted and formed at one end with an oblique face 71b. Mounted in the cover plate 6 is an abutment post 6a. It will be seen that when the knurled head 71 is rotated and the face 71b of pin 71a abuts the post 6a the pin will be moved axially so that upon further rotation of the head 71 the plain end of the pin will abut the post 6a and prevent further rotation of said head 71 until the pin 71a is axially displaced by the operator. In this way the rotation of the head 71 through one complete revolution when carrying out the cleaning of the filter members is automatically indicated to the operator when the plain end of the pin 71a abuts the post 6a, and in this position the head 71 and barrel 31 are correctly positioned to allow subsequent readjustment of the filtering member 1. As shown, the axial movement of pin 71a is preferably limited by a resiliently urged transverse pin 71c engaging in a recess in the body of the pin 71a.

The liquid to be filtered is delivered through the port 9 which communicates with the interior of the body 2 and after passing between the convolutions of the filtering member 1 travels upwardly within the filter member 1 and leaves the filter through the outlet port 10, the direction of travel being indicated by the arrows in Fig. 1.

It will be seen that the provision of the ratchet pawl 62 engaging the spur wheel 59 prevents damage to the cleaning fingers 35 which would be caused if the filter member 1 were to be rotated in an anticlockwise direction, the arrangement illustrated providing for movement of the cleaning fingers in an upward direction only. It will also be noted that it is not possible to effect adjustment of the spacing of the convolutions of the filtering member 1 whilst the cleaning fingers 35 are engaged therebetween since the periphery of the knurled head engages within the arcuate recess 74 during any position except that in which the cleaning fingers are disengaged from the filter member 1.

In the second form of the construction of the invention illustrated in Figs. 8–12 the filter member, instead of being formed as a helical member, consists of a plurality of plates arranged on a drainage tube, means being provided for positively adjusting the interval between the plates to vary the degree of filtration within the limits required.

In this form of construction the filter is formed of a tubular body 80 on the lower end of which is secured a base plate 81 and on the upper end of which is secured a cover plate 82. The base plate 81 has a central outlet port 83 formed therein whilst the cover plate 82 is provided with an inlet port 84. Centrally mounted within the body 80 is a hollow drainage tube 85 provided with a plurality of openings 86 which as shown are equispaced about the periphery of the said drainage tube 85. The said drainage tube 85 is also formed with three equispaced longitudinal grooves 87 (Fig. 11) the purpose of which will be apparent hereinafter. The lower end of the drainage tube 85 is journalled in a bearing formed in the base plate 81 whilst the upper end is integral with a solid portion 88 on which is formed a peripheral flange 89 which is housed in a corresponding recess 90 formed in the underside of the cover plate 82. The upper end of the solid portion 88 of the drainage tube extends through a packing gland 91 mounted in a central boss 82a integral with the cover plate 82 and has secured at its end a knurled head 92. Secured to the underside of the cover plate 82 by means of screws 93 is a ring 94 the upper surface of which abuts the lower face of the flange 89 and retains it in position within the recess 90. The ring 94 has a clearance about a sleeve 95 mounted on the upper solid portion of the drainage tube 85. mounted for rotation on the sleeve 95 is a further ring 96 carried on a shoulder 95a formed on said sleeve. The lower face of the sleeve 95 provides an abutment for an abutment ring 97 which is formed with three inwardly directed radial tongues 97a, adapted to engage in said grooves 87, whereby said plate 92 is secured against rotation relative to the drainage tube 85. Mounted below said abutment ring 97 is a plurality of filter plates 98 which may be of metal, glass, synthetic resin or other impermeable material, each of said filter plates 98 being provided with inwardly directed equispaced radial tongues 98a adapted to engage in groove 87 and thus be axially movable but secured against rotation on the drainage tube 85. The peripheral edge of each of said filter plates 98 is of inverted V-section. The lowermost of said filter plates 98 is engaged by a further abutment ring 99 the lower face of which is formed with a peripheral shoulder forming a seating for one end of a spring 100 the other end of which seats on a corresponding shoulder formed in the upper surface of a further abutment ring 101 which is axially located on the drainage tube 85 by means of a ring 102 located in an annular groove in the lower end of the drainage tube 85.

Equispaced about the assembly of filter plates and drainage tube are three pillars 103 which are journalled at their upper and lower ends in bores formed in the cover plate 82 and the base plate 81 respectively.

Mounted on a shoulder formed on the upper portion of each of the pillars 103 is a pivoted member 104 the upper portion of the shaft being machined square and the pivoted members 104 being formed with corresponding square openings so as to secure them against rotation on said pillars 103. Each of said pivot members 104 is formed with a cam recess 104a, each of which latter is arranged to engage about one of three equispaced pins 105 which are arranged on the underside of the ring 96. The ring 96 is provided over a portion of its periphery with teeth 106 which mesh with a spur wheel 107 mounted on the lower end of a shaft 108 journalled in an opening sealed by a packing gland 109, formed in the cover plate 82. A knurled head 110 is pinned to the upper end of the shaft 108.

Each of the pillars 103 has a longitudinal groove 111 formed therein in which are located a plurality of steel balls 112, the depth of the grooves 111 being such that a portion of each of the balls 112 extends radially beyond the circumference of the shaft 103. The projecting portions of the balls 112 engage within the annular grooves of V-section which are formed between the peripheries of adjacent filter plates 98.

Figure 9:
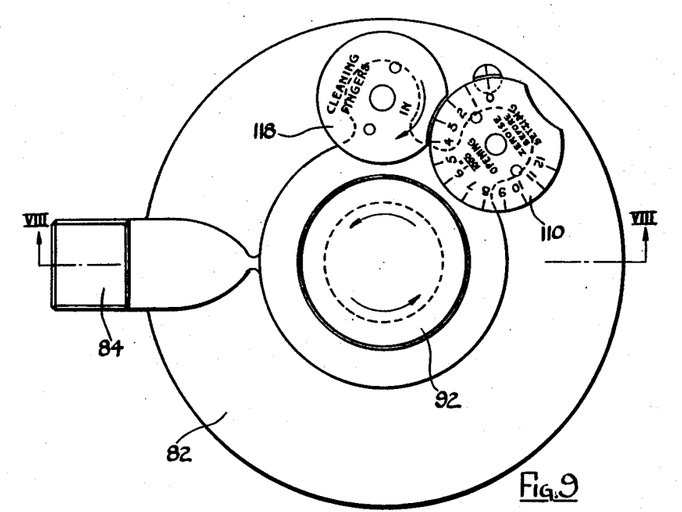
Fig. 9 is a plan of the filter shown in Fig. 8.

Also mounted within the body 80 is a shaft 114 the lower end of which (not shown) is journalled within the base plate 81 and the upper end of which is journalled within the cover plate 82 and sealed therein in a packing gland 115. The portion of the shaft 114 within the casing 80 is formed of D-section and has mounted thereon a plurality of cleaning fingers 116 which are spaced at regular intervals by means of spacing collars 117, the collars 117 and cleaning fingers 116 being formed with openings corresponding to the section of the shaft 114, whereby they are locked against rotary movement on said shaft. Said fingers 116 and collars 117 are also secured against axial movement by suitable means (not shown on the drawing). Secured on the upper end of the shaft 114 is a knurled head 118. The latter has an arcuate portion cut away from its periphery and the knurled head 110 also has a similar portion cut away from its periphery the arrangement being such that, as shown in Fig. 9, the knurled head 118 whereby the shaft 114 carrying the cleaning fingers 116 may be rotated, cannot be rotated until the two arcuate recesses on the knurled heads 118 and 110 lie directly opposite each other. The position of the knurled head 118 in Fig. 9 is that in which the cleaning fingers 116 are not engaged between the plates 98 and it will be seen that in order to effect rotation of the shaft 114 and the fingers 116 the knurled head 110 must first be brought into a definite angular position. Any movement of the knurled head 110 will rotate the shaft 108 and the spur wheel 107 carried thereon, the latter meshing with the toothed portion 106 of the annular plate 96, which is thereby partially rotated about its axis. Such movement will cause the pins 105 to engage the cam recesses 104a of the pivot members 104 and thus effect partial rotation of the pillars 103 in one direction or the other. It will be clear from a consideration of Fig. 11 that rotation of the pillars 103 will cause the balls 112 to penetrate to a varying degree within the V-section groove at the periphery of the plates 98 and, in so doing, vary the space between adjacent plates 98 from zero to, for example, 8 thousandths of an inch, the maximum gap between the plates 98 being provided when the balls 112 and the axes of the plates 98 and the pillars 103 lie in a straight line. The increased axial length of the assembly of plates on the drainage tube 85 is accommodated by the compression of the spring 100 the latter returning the plates to their closed condition upon reversing the rotation of the pillars 103.

Figure 10:
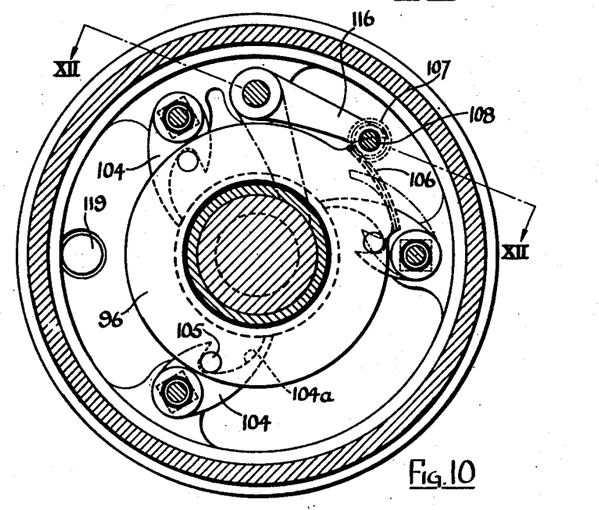
Fig. 10 is a section on the line X—X of Fig. 8.
Figure 11:
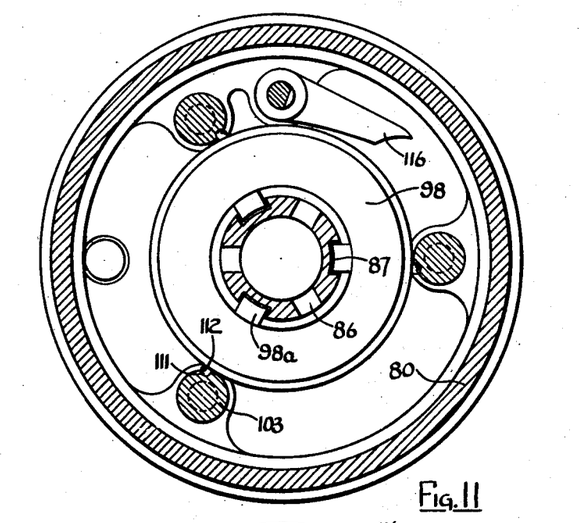
Fig. 11 is a section on the line XI—XI of Fig. 8.
Figure 12:
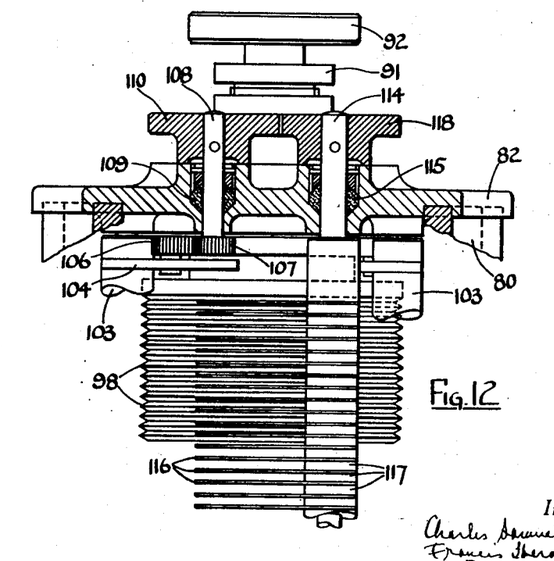
Fig. 12 is a part section on the line XII—XII of Fig. 10.

It will be seen therefore that the knurled head 110 may be so located on the shaft 108 that when the recesses in the knurled heads 118 and 110 lie directly opposite each other the space between the plates 98 will correspond to the thickness of the cleaning fingers 116, and that in this position of the knurled head 110 the knurled head 118 can be rotated to move the cleaning fingers 116 into engagement between the plates 98. The degree of movement of the cleaning fingers 116 is shown in Fig. 10 to normal, disengaged, position of the fingers being shown in full lines, and the cleaning position being shown in chain-dotted lines. When the cleaning fingers are in the latter position the knurled head 92 may be manually rotated in order to rotate the filter plates 98 secured thereon and thereby effect by the relative movement between the plates and the cleaning fingers the removal of foreign matter which has accumulated between said plates. After one or more rotations of the plates the cleaning fingers are restored to their normal disengaged position by a reverse rotation of the knurled head 118 and the gap between the plates may thereafter be adjusted as required by rotation of the knurled head 110.

It will be seen that the arrangement described provides a means whereby the gap between adjacent filter plates may be regulated as required and if necessary during operation of filtering, and that, when filtration is impeded by an accumulation of foreign matter between the plates the latter may be readily cleaned, whilst momentarily discontinuing operation of the filter, by actuation of the cleaning fingers and rotation of the plates. The removed foreign matter may be drained out of the filter by removing a drainage plug 119 (Fig. 8) from the base plate 81.

We claim:

1. A filter comprising a plurality of rotatably mounted filter elements forming gaps between them for passage of a liquid to be filtered and constituting a filtering member, means for relatively adjusting said elements axially to reduce the gaps between them for filtration and for relatively opening the gaps for cleaning of the filter elements, a plurality of cleaning members mounted rotatably for insertion into respective gaps between the filter elements, and means controlled by said adjusting means for relatively rotating the filter elements and cleaning members only while the filter elements are relatively adjusted axially to open the gaps to remove foreign matter accumulating in said gaps during filtration.

2. A filter as defined in claim 1, including inter-controlling members connected respectively to said means for relatively adjusting the filter elements and said means for relatively rotating said filter elements and cleaning members and cooperative to prevent relative rotation between the cleaning members and filter elements while said adjusting means for the filter elements is operable and to prevent operation of said adjusting means while the cleaning members are inserted into the gaps between the filter elements.

3. A filter as defined in claim 1, wherein said filtering member is a helical member having gaps between adjacent convolutions constituting the filter elements, the filter elements having parallel adjacent surfaces, and wherein said adjusting means is operable to vary the spaces or gaps between said surfaces by the application of axial compression or tension to said helical member.

4. A filter as defined in claim 3, including a filter body in which said helical member is mounted, the filter body being provided with said means for applying axial compression and tension to said helical member and for providing a predetermined spacing between the convolutions forming said filter elements for insertion of said cleaning members between the convolutions of said helical member, and means for rotating said helical member while said cleaning members are interengaged with the convolutions of said helical member.

5. A filter comprising a filter body, a helical filtering member mounted rotatably therein, means for applying axial compression and tension to the filtering member to vary the spacing between the convolutions thereof, a shaft mounted rotatably in the filter body and having cleaning fingers equidistantly spaced axially thereon and rotatable into and out of the spaces between convolutions of the filtering member, a manual control device operable exteriorly of the filter body and connected to said shaft and operable by movement in one direction to rotate the cleaning fingers into the spaces between the convolutions of the filtering member while said convolutions are spaced apart a predetermined distance, means operable by further movement of said control device for rotating the filtering member, means operable by a continued movement of said control device in said direction to disengage the cleaning fingers from the filtering member, and means operable by a final movement of said control device in said direction for locking the filtering member from rotation.

6. A filter comprising a filter body, a helical filtering member mounted rotatably therein, means for applying axial compression or tension to the filtering member to vary the spacing between the convolutions thereof, a shaft mounted rotatably in said body and carrying cleaning fingers movable into and out of the spaces between the convolutions of the filtering member, an operating member, a cam connected to said operating member for rotation thereby, gearing connected to said cam and having a spline connection with the filtering member, and a cam follower connected to the shaft carrying the cleaning fingers and operative by rotation of said operating member to disengage the cleaning fingers from the spaces between the convolutions of the filtering member.

7. A filter as defined in claim 6, wherein said means for applying axial compression or tension to the helical filtering member includes a shaft threaded in said filter body and abutting against said filtering member and a head fixed to said threaded shaft, and said head and operating member having portions which are interengageable to lock said operating member from operation while the spacing between the convolutions of the filtering member is insufficient to admit the cleaning fingers.

8. A filter as defined in claim 6, wherein said means for applying axial compression or tension to the helical filtering member includes a shaft threaded in said filter body and abutting against said filtering member and a head fixed to said threaded shaft, and said head and operating member having portions which are interengageable to lock said head from operation while the cleaning fingers are in the spaces between the convolutions of the filtering member.

9. A filter as defined in claim 6, wherein said cleaning fingers are splined on said shaft which carries them for movement axially thereon in conformity with the paths of movement of the spaces between the convolutions of the filtering member during rotation of said member, and including a spring acting on said cleaning fingers to permit axial movement thereof during rotation of the filtering member and to restore the cleaning fingers to predetermined equidistant axial spacing on said shaft after disengagement of said fingers from the filtering member.

10. A filter comprising a filter body, a filtering member mounted rotatably in the filter body and composed of an assembly of filter plates having bevelled peripheral edges, means for pressing said plates together to provide filtering gaps between adjacent plates, wedge means movable radially inwardly or outwardly between the bevelled edges of adjacent filter plates to vary the gaps between them, cleaning elements mounted rotatably in the filter body for movement into and out of the gaps between the filter plates, and means for relatively rotating the filter plates and cleaning elements.

11. A filter as defined in claim 10, wherein said wedge means comprises a plurality of pillars mounted rotatably in said filter body parallel to and about the axis of said filtering member and having axial grooves therein, balls mounted in the grooves in the pillars, and means for partially rotating the pillars simultaneously to force the balls in the respective grooves thereof between the bevelled peripheral edges of said plates to vary the gap between adjacent plates.

12. A filter as defined in claim 10, including a shaft mounted rotatably in the filter body in parallelism with the axis of the assembly of filter plates and having said cleaning elements fixed thereon at regular intervals axially thereof, and means for rotating said shaft to engage the cleaning elements between the filter plates.

13. A filter as defined in claim 10, including an operating head connected to said cleaning elements for rotating them, and a head connected to said wedge means for varying the gaps between said filter plates, said heads having portions which are interengageable to lock one of said heads from operation except while the other head occupies a predetermined position.

14. A filter as defined in claim 10, including an operating head connected to said cleaning elements for rotating them, and a head connected to said wedge means for varying the gaps between said filter plates, said heads having portions which are interengageable to lock the cleaning elements from rotation except while said wedge means is in condition to provide a predetermined spacing between the filter plates.

15. A filter as defined in claim 10, including an operating head connected to said cleaning elements for rotating them, and a head connected to said wedge means for varying the gaps between said filter plates, said heads having portions which are interengageable to prevent operation of said wedge means while the cleaning elements are between the filter plates.

16. A filter as defined in claim 10, wherein said wedge means comprises a plurality of axially grooved pillars mounted rotatably in the filter body in parallelism with and spaced about the axis of said filtering member and balls mounted in the grooves of the pillars adjacent to the bevelled peripheral edges of the filter plates, a ring mounted rotatably in the filter body and having means for rotating it, cams fixed to the pillars, and pins on said ring and cooperative with same cams for partially rotating the pillars by rotation of said ring.

CHARLES SAMUEL GARLAND.
FRANCIS HERON ROGERS.

References Cited in the file of this patent

UNITED STATES PATENTS

| Number | Name | Date |
| --- | --- | --- |
| Re. 22,199 | Nordell | Oct. 13, 1942 |
| 1,150,910 | Warmington | Aug. 24, 1915 |
| 1,872,478 | Marks | Aug. 16, 1932 |
| 1,960,303 | Durdin, Jr. | May 29, 1934 |